(12) United States Patent
Pace et al.

(10) Patent No.: US 8,193,798 B1
(45) Date of Patent: Jun. 5, 2012

(54) BUCK REGULATORS WITH ADJUSTABLE CLOCK FREQUENCY TO ACHIEVE DROPOUT VOLTAGE REDUCTION

(75) Inventors: W. David Pace, Phoenix, AZ (US); Robert H. Bell, Tempe, AZ (US); Steven L. Harris, Chandler, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 286 days.

(21) Appl. No.: 12/608,676

(22) Filed: Oct. 29, 2009

(51) Int. Cl.
*G05F 1/00* (2006.01)
(52) U.S. Cl. .................................. 323/284; 323/288
(58) Field of Classification Search .................. 323/224, 323/282, 284, 285, 351, 288
See application file for complete search history.

(56) References Cited

U.S. PATENT DOCUMENTS

| | | | | |
|---|---|---|---|---|
| 5,705,919 A * | 1/1998 | Wilcox | ......... | 323/282 |
| 5,814,979 A * | 9/1998 | Grimm | ......... | 323/284 |
| 5,959,443 A * | 9/1999 | Littlefield | ......... | 323/287 |
| 6,674,268 B2 * | 1/2004 | Rutter et al. | ......... | 323/224 |
| 7,298,124 B2 * | 11/2007 | Kan et al. | ......... | 323/283 |
| 7,446,517 B2 * | 11/2008 | Chen et al. | ......... | 323/284 |
| 7,652,461 B2 * | 1/2010 | Tateishi | ......... | 323/284 |
| 7,755,341 B2 * | 7/2010 | Philbrick | ......... | 323/282 |
| 2009/0261794 A1 * | 10/2009 | Capilla et al. | ......... | 323/283 |

OTHER PUBLICATIONS

"Flexible Single-ended Current Mode PWM Controller", intersil, Mar. 5, 2008, p. 1-22.
"Voltage regulator", www.wikipedia.org, Nov. 19, 2009, 7 pages.
"Low-dropout regulator", www.wikipedia.org, Oct. 22, 2009, 2 pages.
"Wide Input Range Non-Synchronous Buck Controller", National Semiconductor Corporation, Jun. 8, 2009, 26 pages.
"Small Footprint, Wide Vin Range Synchronous Step-Down Controller", Linear Technology, 2009, 28 pages.
"Wide Range Synchronous Buck Controller", National Semiconductor Corporation, Dec. 8, 2008, 26 pages.

* cited by examiner

*Primary Examiner* — Gary L Laxton
*Assistant Examiner* — Zekre Tsehaye
(74) *Attorney, Agent, or Firm* — Wade J. Brady, III; Frederick J. Telecky, Jr.

(57) ABSTRACT

A method includes generating a drive signal for a transistor in a switching regulator. The drive signal turns the transistor on and off to generate a regulated output voltage. The drive signal is generated based on a clock signal. The method also includes dynamically decreasing a frequency of the clock signal to decrease a dropout voltage of the switching regulator. Dynamically decreasing the frequency of the clock signal can increase a duration of switching periods defined by the clock signal. The dropout voltage could have a first value proportional to $T_{OFF\_MIN}/T_{ON\_MAX}$ during shorter switching periods and a second value proportional to $T_{OFF\_MIN}/T_{ON\_MAX\_DFC}$ during longer switching periods. $T_{OFF\_MIN}$ represents a minimum amount of off-time for the transistor during each switching period, $T_{ON\_MAX}$ represents a maximum amount of on-time for the transistor during shorter switching periods, and $T_{ON\_MAX\_DFC}$ represent a maximum amount of on-time for the transistor during longer switching periods.

21 Claims, 9 Drawing Sheets

BUCK REGULATORS WITH ADJUSTABLE CLOCK FREQUENCY TO ACHIEVE DROPOUT VOLTAGE REDUCTION

TECHNICAL FIELD

This disclosure is generally directed to switching regulators. More specifically, this disclosure is directed to buck regulators with dropout voltage reduction.

BACKGROUND

Many systems use switching regulators to produce regulated voltages for use by other components of the systems. In a buck or step-down regulator, the regulator produces an output voltage $V_{OUT}$ that is lower than its input voltage $V_{IN}$. The output voltage $V_{OUT}$ can remain generally consistent or in regulation even as the input voltage $V_{IN}$ varies. However, one problem is that the buck regulator can suffer from dropout if its input voltage $V_{IN}$ becomes too low. During dropout, the input voltage $V_{IN}$ drops below some threshold voltage level, and the buck regulator can no longer maintain regulation of the output voltage $V_{OUT}$. When that occurs, the output voltage $V_{OUT}$ follows the input voltage $V_{IN}$, so further drops in the input voltage $V_{IN}$ cause corresponding drops in the output voltage $V_{OUT}$.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
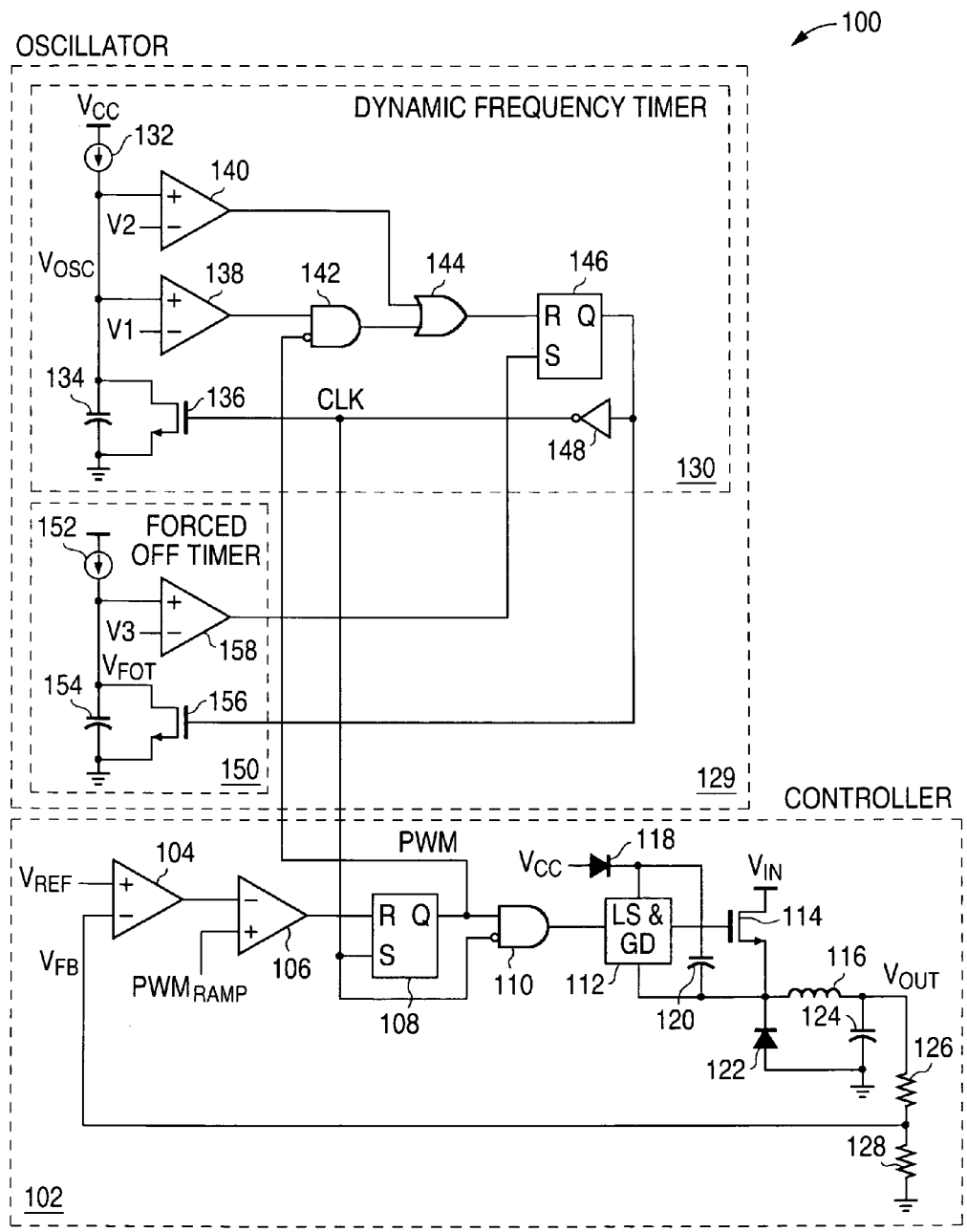
FIG. 1 illustrates an example switching regulator having dynamic dropout voltage reduction according to this disclosure.

FIG. 1 illustrates an example switching regulator 100 having dynamic dropout voltage reduction according to this disclosure. As shown in FIG. 1, the switching regulator 100 includes a controller 102, which controls the production of an output voltage $V_{OUT}$. In this example, the controller 102 includes an error amplifier 104 that receives a reference voltage $V_{REF}$ and a feedback voltage $V_{FB}$ (forming a control loop) as inputs. The error amplifier 104 generates an output by amplifying an error between the two inputs. A comparator 106 compares the output of the error amplifier 104 to a ramp voltage $PWM_{RAMP}$ and produces an output based on the comparison. The error amplifier 104 includes any suitable structure for amplifying an error between inputs. The comparator 106 includes any suitable structure for comparing inputs.

The output of the comparator 106 is provided as a reset input to a set-reset latch 108. A set input to the latch 108 represents a clock signal CLK. The latch 108 produces an output PWM, which represents a pulse-width modulated (PWM) control signal used to produce the output voltage $V_{OUT}$. The output of the latch 108 and an inverted clock signal are provided as inputs to an AND gate 110, which performs a logical AND operation to produce an output. The latch 108 includes any suitable structure for performing bistable latching. The AND gate 110 includes any suitable structure for performing logical AND operations.

The output of the AND gate 110 is provided to a level shifter and gate driver (LS & GD) 112. The level shifter and gate driver 112 level shifts the output from the AND gate 110 and generates an output for driving an output transistor 114. The output transistor 114 operates to couple an input voltage $V_{IN}$ to an inductor 116, which produces the output voltage $V_{OUT}$. The level shifter and gate driver 112 includes any suitable structure for level shifting signals and for driving at least one transistor. The transistor 114 includes any suitable switching device, such as an n-channel metal oxide semiconductor (NMOS) transistor. The inductor 116 includes any suitable inductive structure having any suitable inductance.

The level shifter and gate driver 112 is coupled to a diode 118, which receives a bias voltage $V_{CC}$. The level shifter and gate driver 112 is also coupled to a capacitor 120 and a diode 122, which is coupled to the inductor 116 and a capacitor 124. Each of the diodes 118 and 122 represents any suitable structure for substantially limiting current flow to one direction. Each of the capacitors 120 and 124 represents any suitable capacitive structure having any suitable capacitance. Two resistors 126-128 are coupled between the output voltage $V_{OUT}$ and ground, forming a voltage divider. The feedback voltage $V_{FB}$ is produced between the resistors 126-128. Each of the resistors 126-128 represents any suitable resistive structure having any suitable resistance.

During operation, the PWM signal produced by the latch 108 causes the level shifter and gate driver 112 to repeatedly turn the output transistor 114 on and off. This causes the output transistor 114 to couple and uncouple the input voltage $V_{IN}$ to and from the inductor 116, which charges and discharges the inductor 116. By adjusting the duty cycle of the PWM signal, the controller 102 can adjust the charging and discharging of the inductor 116, thereby controlling the output voltage $V_{OUT}$ produced.

As shown in FIG. 1, the clock signal CLK is produced by an oscillator 129. The oscillator 129 includes a dynamic frequency timer 130, which dynamically controls the frequency of the clock signal CLK to implement dynamic frequency control (DFC). In this example, the dynamic frequency timer 130 includes a current source 132 that provides a current to a capacitor 134, which charges the capacitor 134. The capacitor 134 is coupled in parallel with a transistor 136 that, when turned on, causes discharge of the capacitor 134. The current source 132 includes any suitable structure for generating a current. The capacitor 134 represents any suitable capacitive structure having any suitable capacitance. The transistor 136 includes any suitable switching device, such as an NMOS transistor.

The charging and discharging of the capacitor 134 produces a ramp voltage $V_{OSC}$, which is provided to two comparators 138-140. The comparator 138 compares the ramp voltage $V_{OSC}$ to a first threshold voltage V1 and produces an output based on the comparison. The comparator 138 functions as a normal "maximum on" timer. While the amount of time that the transistor 114 is on can vary based on the duty cycle of the PWM signal, there is typically a maximum amount of time that the transistor 114 can be turned on. During normal operation, the comparator 138 operates to define the maximum time that the transistor 114 can be turned on and, when that time is met in a switching period, forces the transistor 114 off.

The comparator 140 compares the ramp voltage $V_{OSC}$ to a second threshold voltage V2 and produces an output based on the comparison (where V2>V1). The comparator 140 here functions as an extended "maximum on" timer. As described below, when the switching regulator 100 is about to experience dropout, the comparator 140 operates to extend the maximum time that the transistor 114 can be turned on by decreasing the frequency of the clock signal CLK. During this operation, the comparator 140 operates to define a longer maximum time that the transistor 114 can be turned on and, when that time is met in a switching period, forces the transistor 114 off. This can be done to lower the dropout voltage of the switching regulator 100, which can help to keep the switching regulator 100 in regulation. Each comparator 138-140 includes any suitable structure for comparing inputs.

The output of the comparator 138 and an inverted PWM signal are provided to an AND gate 142, which performs a logical AND operation to produce an output. The outputs of the comparator 140 and the AND gate 142 are provided to an OR gate 144, which performs a logical OR operation to produce an output. The output of the OR gate 144 is provided as a reset input to a set-reset latch 146. An output of the latch 146 is provided to an inverter 148, which produces the clock signal CLK. The clock signal CLK is provided to a gate of the transistor 136. The AND gate 142 includes any suitable structure for performing logical AND operations. The OR gate 144 includes any suitable structure for performing logical OR operations. The latch 146 includes any suitable structure for performing bistable latching. The inverter 148 includes any suitable structure for inverting a signal.

The oscillator 129 also includes a forced off timer 150, which forces the latch 146 to toggle and causes the output transistor 114 to turn on after a minimum amount of off time. In this example, the forced off timer 150 includes a current source 152, a capacitor 154, a transistor 156, and a comparator 158. The current source 152 produces a current that charges the capacitor 154, and the transistor 156 causes discharge of the capacitor 134 when turned on. This charging and discharging produces a ramp voltage $V_{FOT}$, which the comparator 158 compares to a third reference voltage V3 to produce an output. The output of the comparator 158 is provided as a set input to the latch 146. The current source 152 includes any suitable structure for generating a current. The capacitor 154 represents any suitable capacitive structure having any suitable capacitance. The transistor 156 includes any suitable switching device, such as an NMOS transistor. The comparator 158 includes any suitable structure for comparing inputs.

Operation of the switching regulator 100 is described with reference to FIG. 2, which illustrates example waveforms associated with operation of the switching regulator 100 of FIG. 1 according to this disclosure. The following notations are used in the description of FIG. 2. The frequency of the clock signal CLK is denoted $F_{OSC}$, and the duration of one clock cycle or switching period in the clock signal CLK is denoted $T_{OSC}$. The time in a switching period that the output transistor 114 is turned on is denoted $T_{ON}$, and the time in the switching period that the output transistor 114 is turned off is denoted $T_{OFF}$ (where $T_{ON}+T_{OFF}=T_{OSC}$). The maximum time in a switching period that the output transistor 114 can be turned on during normal operation is denoted $T_{ON\_MAX}$, and the minimum time in a switching period that the output transistor 114 can be turned off is denoted $T_{OFF\_MIN}$ (where $T_{ON\_MAX}=T_{OSC}-T_{OFF\_MIN}$). Pulses in the clock signal CLK could be equal in duration to the minimum off time $T_{OFF\_MIN}$. The maximum time in a switching period that the output transistor 114 can be turned on during dropout operation is denoted $T_{ON\_MAX\_DFC}$. Dropout is defined as the condition where the output voltage $V_{OUT}$ drops because the input voltage $V_{IN}$ becomes too low to maintain regulation of the output voltage $V_{OUT}$. The dropout voltage represents the input voltage $V_{IN}$ and the output voltage $V_{OUT}$ at the onset of dropout and is often defined as $V_{IN}-V_{OUT}$. Since the dropout voltage is proportional to the value $T_{OFF\_MIN}/T_{ON\_MAX}$ during normal operation and proportional to the value $T_{OFF\_MIN}/T_{ON\_MAX\_DFC}$ during dropout operation, the dropout voltage becomes smaller since $T_{ON\_MAX\_DFC}$ is greater than $T_{ON\_MAX}$.

During normal operation (denoted "Region 1" in FIG. 2), the output transistor 114 is turned on and off to provide a generally constant output voltage $V_{OUT}$. During this time, the value $T_{ON}$ is controlled by the oscillator 129, the comparator 106, and the latch 108. At the beginning of a switching period, the clock signal CLK goes low, and the output transistor 114 turns on to charge the inductor 116. During steady-state operation, the latch 108 is eventually reset by the comparator 106, turning off the output transistor 114 and discharging the inductor 116. The clock signal CLK is forced high by the comparator 138 when the ramp voltage $V_{OSC}$ equals or exceeds the first reference voltage V1. At the end of this switching period (or at the beginning of the next switching period), the clock signal CLK goes low again, and the process repeats.

During transition operation (denoted "Region 2" in FIG. 2), the input voltage $V_{IN}$ begins to fall, and the frequency of the clock signal CLK decreases as shown by the increasing distance between clock pulses. During this time, the ramp voltage $V_{OSC}$ is allowed to exceed the first threshold voltage V1 (thereby extending the current switching period), but it remains below the second threshold voltage V2. The clock signal CLK is forced high by the comparator 138 tripping (going high) and the PWM signal going low, which causes the AND gate 142 to output a signal that toggles the latch 146. Note that the frequency in Region 2 is gradually decreased as the input voltage $V_{IN}$ drops more and more. The value $T_{ON}$ can increase beyond $T_{ON\_MAX}$ during transition operation because there is more time during the switching period for the output transistor 114 to remain on. As a result, the output voltage $V_{OUT}$ remains in regulation even as the input voltage $V_{IN}$ falls. The dynamic adjustment of the clock signal frequency prolongs the time that the switching regulator 100 remains in regulation.

In buck regulators, the dropout voltage is proportional to the value $T_{OFF\_MIN}/T_{ON\_MAX}$. As a result, reducing the dropout voltage often requires decreasing $T_{OFF\_MIN}$ or increasing $T_{ON\_MAX}$. Since the value $T_{OFF\_MIN}$ is often based on circuit topology, the switching regulator 100 operates to increase $T_{ON\_MAX}$ by reducing the frequency $F_{OSC}$. Because the frequency $F_{OSC}$ is reduced, the switching period $T_{OSC}$ increases. Since $T_{OSC}=T_{ON}+T_{OFF}$, increasing the switching period $T_{OSC}$ allows the output transistor 114 to be turned on for longer periods of time, so $T_{ON}$ can increase during the switching period. The frequency $F_{OSC}$ of the clock signal CLK remains unchanged during normal operation, and the frequency $F_{OSC}$ of the clock signal CLK is decreased when a dropout condition is approached. This actually lowers the dropout voltage in Region 2, so the switching regulator 100 can remain in regulation even though the input voltage $V_{IN}$ is dropping and the difference $V_{IN}$-$V_{OUT}$ would ordinarily cause dropout to occur in Region 2.

Figure 2:
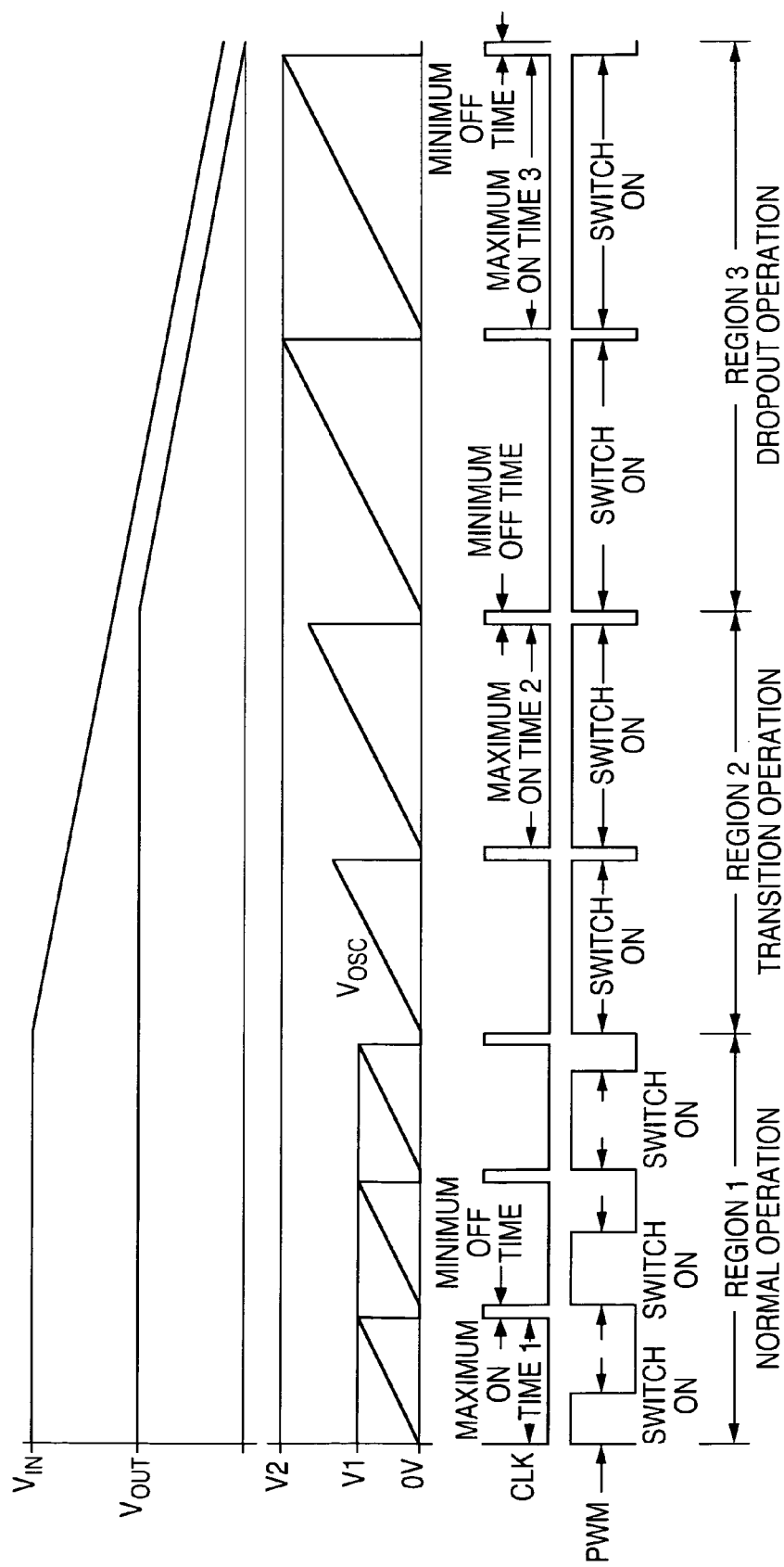
FIG. 2 illustrates example waveforms associated with operation of the switching regulator of FIG. 1 according to this disclosure.

If the input voltage $V_{IN}$ continues to fall, it can reach a point where even dynamic frequency control cannot maintain regulation, and the switching regulator 100 enters dropout operation (denoted "Region 3" in FIG. 2). At this point, the switching regulator 100 is out of regulation and operating in dropout mode, and the output voltage $V_{OUT}$ follows the input voltage $V_{IN}$. The clock signal CLK is forced high by the comparator 140 when the ramp voltage $V_{OSC}$ equals or exceeds the second reference voltage V2.

Effectively, the dynamic frequency timer 130 can monitor whether the latch 108 has been reset before the normal end of a switching period (when $T_{ON}$ would equal $T_{ON\_MAX}$ and the ramp voltage $V_{OSC}$ would equal or exceed the first threshold voltage V1). If not, the dynamic frequency timer 130 extends the current switching period and allows it to continue. This reduces the frequency $F_{OSC}$ of the clock signal CLK.

Note that the transition into and out of dynamic frequency control is smooth and does not interfere with system dynamics. In other words, the frequency of the clock signal CLK can be varied smoothly as the input voltage varies. The switching regulator 100 can smoothly move back and forth between Regions 1, 2, and 3. Also note that the dynamic frequency control could provide similar benefits at other times, such as by improving load transient response (since a transition from a light load to a heavy load can have the same or similar signature as a dropout condition).

As noted above, the second threshold voltage V2 is greater than the first threshold voltage V1. In some embodiments, the charging of the capacitor 134 is linear. In other embodiments, the charging of the capacitor 134 is non-linear, such as when the current from the current source 132 is reduced when the switching regulator 100 is operating in Region 2 or Region 3 of FIG. 2. This may allow a smaller second threshold voltage V2 to use used. In particular embodiments, V1 is 1.25V and V2 is 2.5V.

Although FIG. 1 illustrates one example of a switching regulator 100 having dynamic dropout voltage reduction, various changes may be made to FIG. 1. For example, the functional division shown in FIG. 1 is for illustration only. Various components in FIG. 1 could be omitted, combined, or further subdivided and additional components could be added according to particular needs. Also, each component in FIG. 1 could be implemented using any suitable structure(s). Although FIG. 2 illustrates examples of the waveforms associated with operation of the switching regulator 100, various changes may be made to FIG. 2. For instance, the waveforms could vary from those shown in FIG. 2, such as when the input voltage $V_{IN}$ varies in other ways.

Figure 3:
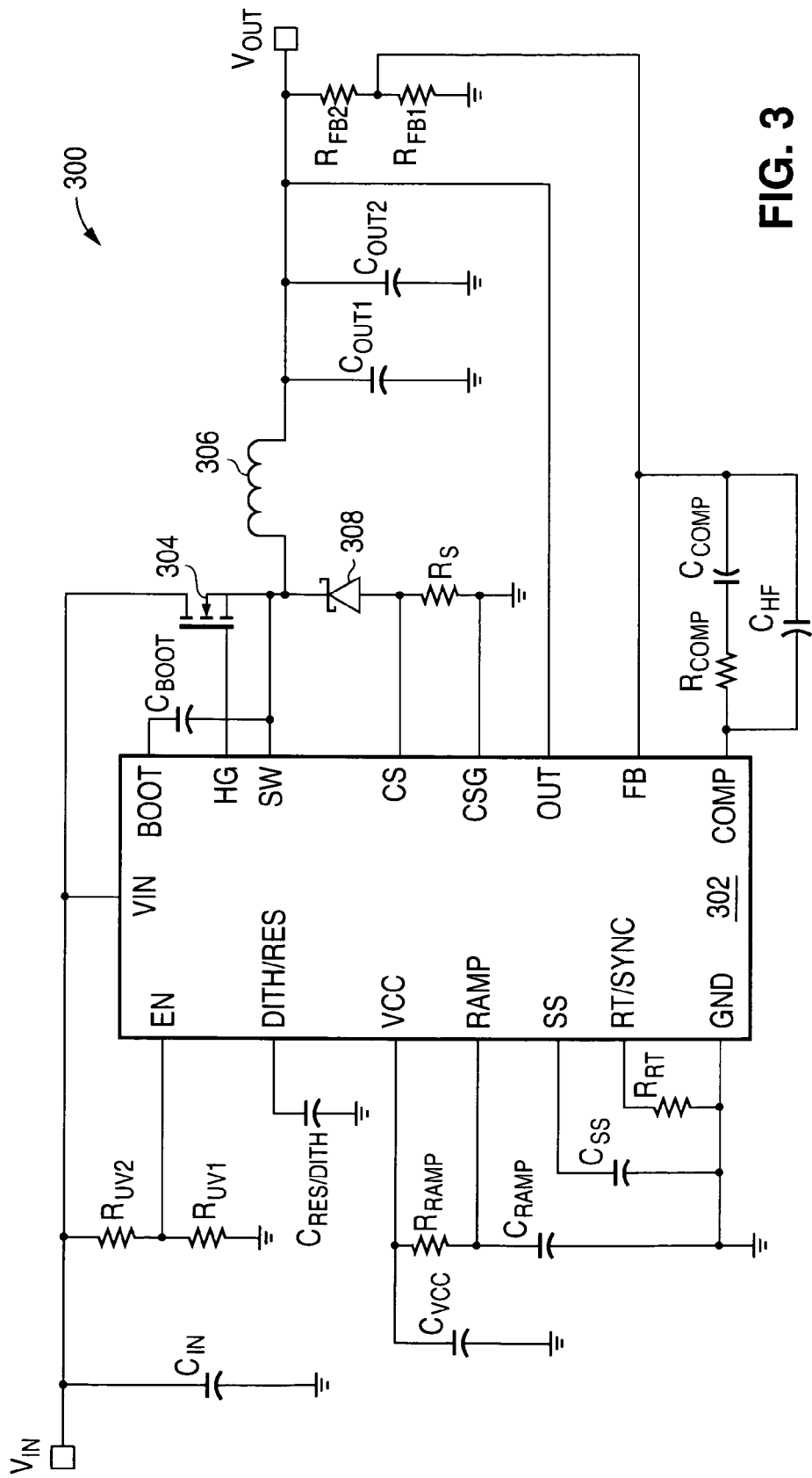
FIGS. 3 through 7 illustrate a specific implementation of a switching regulator having dynamic dropout voltage reduction and related details according to this disclosure.

FIGS. 3 through 7 illustrate a specific implementation of a switching regulator 300 having dynamic dropout voltage reduction and related details according to this disclosure. As shown in FIG. 3, the switching regulator 300 includes a non-synchronous buck controller 302 implemented using an integrated circuit chip. The controller 302 is coupled to an output transistor 304, an inductor 306, and a diode 308. The output transistor 304 could represent an SI7148DP n-channel MOSFET from VISHAY SILICONIX. The diode 308 could represent an MBRB2060CT Schottky diode from ON SEMICONDUCTOR. For output loads of at least 5 A or for high input voltage applications, a diode in a D²PAK package could be used to support worst-case power dissipation. A snubber network can be placed across the diode 308 to reduce ringing and spikes. The snubber network could include a 3Ω to 10Ω resistor and a capacitor that is four to five times the junction capacitance of the diode 308. The controller 302 is also coupled to various capacitors and resistors. Each of the components used with the controller 302 could represent any suitable component having any suitable component value.

Figure 4A:
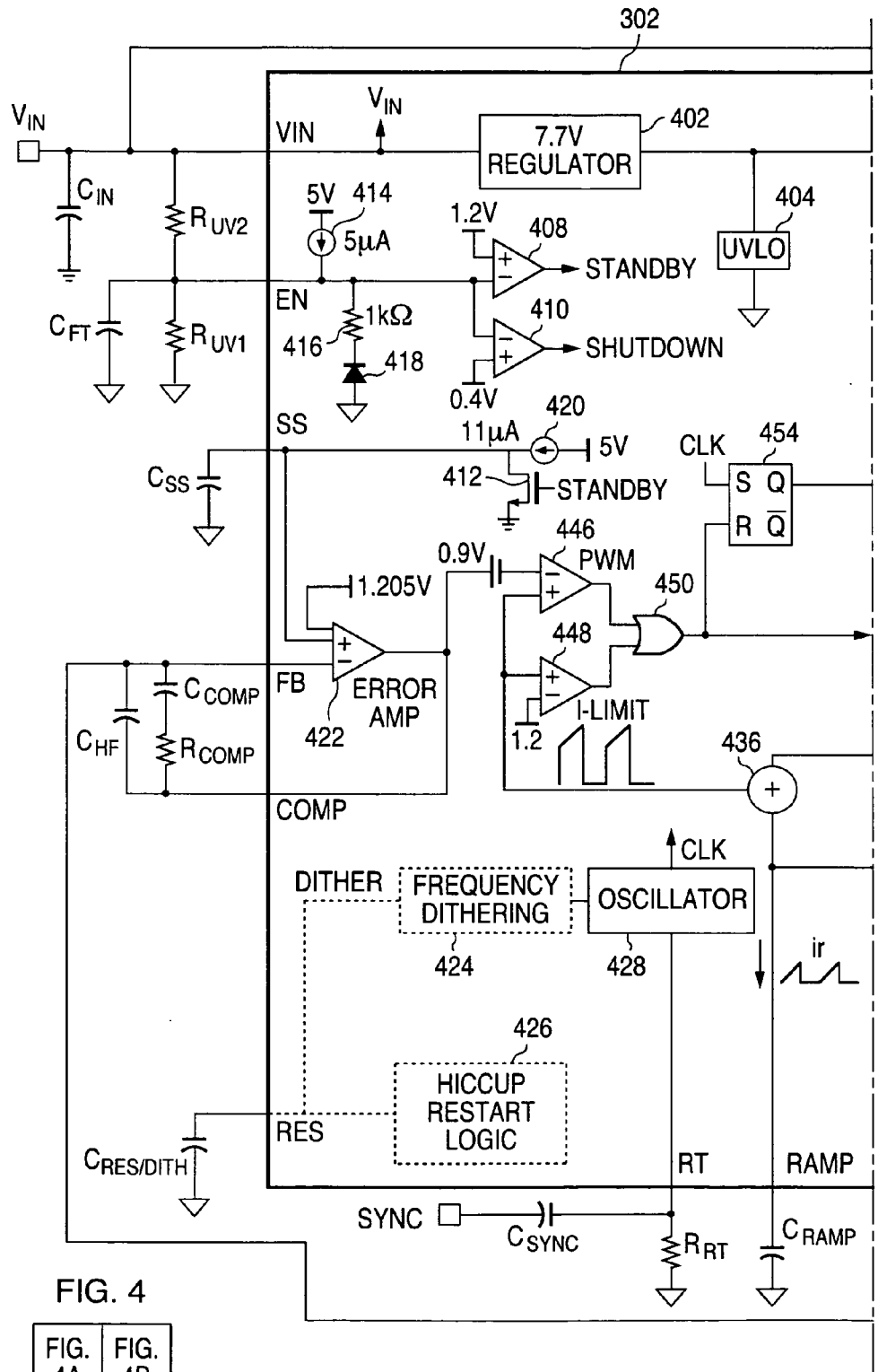
Figure 4B:
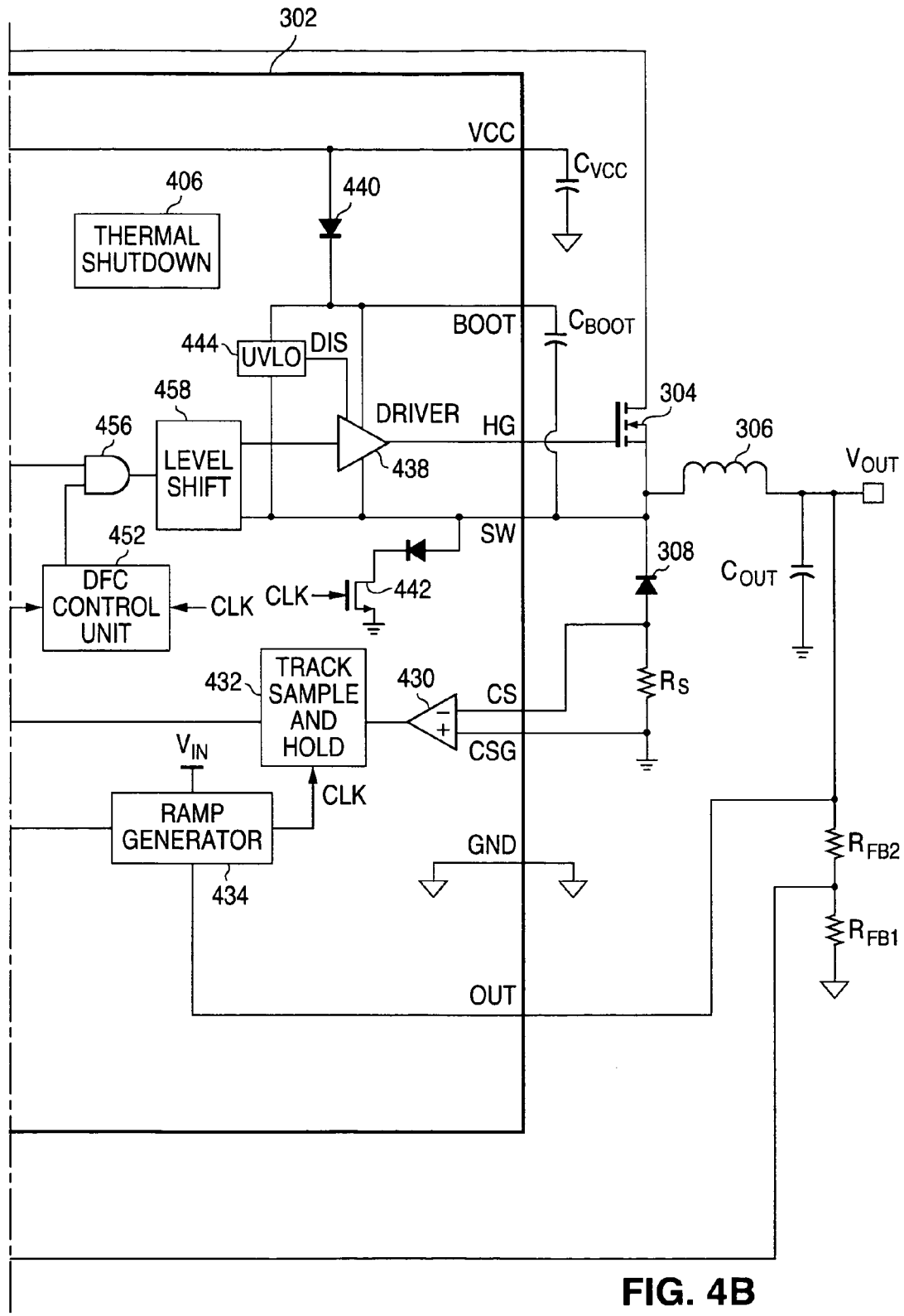

As shown in FIG. 4, the controller 302 includes an input voltage pin VIN that receives an input voltage $V_{IN}$, which could span a wide range of voltages such as 4.5V-75V. A low dropout bias voltage regulator 402 generates a bias voltage $V_{CC}$ that tracks the input voltage $V_{IN}$ up to some maximum value, such as 7.7V or 7.8V. The bias voltage regulator 402 could be internally current limited, such as to 30 mA. Note that a printed circuit board layout and bypass capacitors located close to the VIN pin can be used to help ensure that load and line transients do not exceed the buck controller's maximum voltage rating.

An under-voltage lockout (UVLO) unit 404 detects if the output of the voltage regulator 402 falls below a threshold, such as 3.8V. A thermal shutdown unit 406 detects if the temperature of the controller 302 exceeds a threshold, such as 165° C. Either unit 404 or 406 when tripped could disable an output driver 438 and the regulator 402 and place the controller 302 in a low-power reset state.

An enable input pin EN is used to enable and disable the controller 302. For example, if the voltage on the EN pin is below 0.4V, the buck controller 302 can be in low-power mode. If the voltage is between 0.4V and 1.2V, the controller 302 can be in standby mode where the controller 302 is active, the output switch 304 is disabled, and an SS pin is held low. If the voltage is above 1.2V (and the VCC pin is above an upper threshold such as 4V), the controller 302 can be in operational mode where the controller 302 is active, the output switch 304 is enabled, and the SS pin is enabled. Two comparators 408-410 can identify the mode of the controller 302. The comparators 408-410 may include a hysteresis, such as 100 mV, for the standby and shutdown thresholds. A transistor 412 can be used to pull the SS pin low.

A voltage divider formed by resistors $R_{UV1}$ and $R_{UV2}$ can set the voltage on the EN pin. The voltage divider could be configured so that a voltage above 1.2V and below 14V is applied to the EN pin to activate the controller 302. If the EN pin is left open, a pull-up current source 414, such as a 5 µA source, forces the EN pin to a high state and enables the controller 302. A resistor 416, such as a 1 kΩ resistor, and a Zener clamp diode 418 are coupled in series between the current source 414 and ground.

A soft-start pin SS supports a soft-start feature, which forces the output voltage $V_{OUT}$ to rise linearly until it reaches a steady-state operating voltage set by two feedback resistors $R_{FB1}$ and $R_{FB2}$. The resistance of the resistor $R_{FB1}$ could be selected so that the current through that resistor $R_{FB1}$ is between 100 µA and 1 mA. A feedback pin FB is regulated to the SS pin's voltage or an internal reference such as 1.205V, which ever is lower. At the beginning of a soft-start sequence, $V_{SS}$ may equal 0V, and an internal current source 420 (such as an 11 µA source) gradually increases the voltage on a soft-start capacitor $C_{SS}$. The SS pin can be held low in standby, $V_{CC}$ under-voltage, and thermal shutdown states by the transistor 412. A wide bandwidth error amplifier 422 can clamp the SS pin's voltage, such as at 120 mV above the FB pin's voltage. This feature provides soft-start controlled recovery with reduced output overshoot if the output voltage $V_{OUT}$ momentarily dips out of regulation.

The feedback pin FB is coupled to the inverting input of the error amplifier 422. A regulation threshold voltage, such as 1.205V, and the SS pin are coupled to the non-inverting input of the error amplifier 422. A compensation pin COMP is coupled to an output of the error amplifier 422 and to a loop compensation network, such as a type II network formed by capacitors $C_{HF}$ and $C_{COMP}$ and a resistor $R_{COMP}$ (which also configure the amplifier gain characteristics). The loop compensation network is coupled between the feedback pin FB and the compensation pin COMP. A dither/restart pin can be used in conjunction with a frequency dithering circuit 424 or hiccup restart logic 426 described below. Note that separate dither and restart pins could also be used.

An RT/SYNC pin controls the frequency of a clock signal CLK produced by an oscillator 428. The oscillator 428 can be programmed with a single resistor $R_{RT}$, and the frequency could fall within a range of 50 kHz to 1 MHz, for instance. A synchronization signal higher in frequency than the programmed frequency (such as up to twice the programmed frequency) can be applied to this pin through a small coupling capacitor $C_{SYNC}$, and the resistor $R_{RT}$ may be used with external synchronization. The voltage on the RT/SYNC pin may need to exceed a certain level, such as 3V, to trip an internal clock synchronization pulse detector in the oscillator 428. The width of clock pulses in the external signal may be less than 150 ns, for example. A free-running frequency of the oscillator 428 could be set, for instance, to approximately 15% below the external signal's frequency.

A ramp pin RAMP can be connected to a ramp capacitor $C_{RAMP}$ to set the slope of a ramp voltage used during emulated current mode control. The capacitor $C_{RAMP}$ could be between 100 pF to 2000 pF. A ground pin GND is coupled to ground, and an output voltage pin OUT is coupled to the output voltage $V_{OUT}$.

A current sense pin CS and a current sense ground pin CSG are used to take current measurements associated with the re-circulating diode 308. A sense resistor $R_S$, an amplifier 430, and a sample/hold circuit 432 are used with a ramp generator 434 and a combiner 436 to produce an emulated current signal. The amplifier 430 could provide any suitable gain such as 10V/V, and the ramp generator 434 could have any suitable transconductance such as 5 µA/V.

The controller 302 here utilizes a control method based on peak current mode control using an emulated current ramp. In some embodiments, the ramp generator 434 does not actually measure current through the output transistor 304 and instead reconstructs or emulates that current. This helps to avoid problems such as leading edge spikes, current measurement delays, and filtering delays. Here, the sample/hold circuit 432 measures a voltage across the sense resistor $R_S$, such as at the conclusion of the buck switch off-time just prior to the onset of the next conduction interval of the output transistor 304. The voltage across the sense resistor $R_S$ is provided to the ramp generator 434 as a DC voltage level used to reconstruct the current signal.

An internal current source in the ramp generator 434 and the capacitor $C_{RAMP}$ are used to construct a positive-slope inductor current ramp signal, which is provided to the combiner 436. The internal current source could emulate the inductor current as a function of $V_{IN}$ and $V_{OUT}$, such as by multiplying 5 µA per volt by a product of the input and output voltages and adding 25 µA. The 25 µA is used to provide slope compensation, which may be needed to prevent sub-harmonic oscillation when the duty cycle of the controller 302 is greater than 50%. In some high output voltage applications (such as when $V_{OUT}$ is greater than 5V), a pull-up resistor can be added between the RAMP and VCC pins and coupled to the capacitor $C_{RAMP}$ in series to increase the slope compensation. The optimal slope compensation current could equal 5 µA per volt in the output voltage $V_{OUT}$.

A switching node pin SW is coupled to a source of the output transistor 304, and a high gate pin HG is coupled to a gate of the output transistor 304. A bootstrap pin BOOT is coupled to a bootstrap capacitor $C_{BOOT}$, which is also coupled to the switching node pin SW. The bootstrap capacitor $C_{BOOT}$ provides bias to a MOSFET gate driver 438, which drives the output transistor 304. The capacitor $C_{BOOT}$ is charged from the bias voltage $V_{CC}$ via a diode 440 during the off-time of the output transistor 304. Forced off-time can be used to ensure that the capacitor $C_{BOOT}$ is adequately recharged. A transistor 442 implements a pre-charge circuit that can be turned on during the forced off-time to help replenish the capacitor $C_{BOOT}$. The driver 438 can be disabled by an under-voltage lockout unit 444.

A bias voltage pin VCC can track the input voltage $V_{IN}$ up to a regulation level (such as 7.8V), and a capacitor $C_{VCC}$ could be coupled to this pin. The capacitor $C_{VCC}$ could be a ceramic decoupling capacitor with a capacitance between 0.1 µF and 10 µF. Also, an external voltage can be applied to the VCC pin to reduce internal power dissipation. If the external voltage is greater than a certain level like 8.2V, the regulator 402 can be disabled. The controller 302 could enter the operational state, enable output on the HG pin, and begin soft-startup when the bias voltage $V_{CC}$ exceeds 4V and the voltage on the enable pin EN exceeds 1.2V. If the bias voltage $V_{CC}$ falls below 3.8V or the voltage on the enable pin EN falls below 1.1V, output on the HG pin could be disabled.

To control the driving of the output transistor 304, the controller 302 includes two comparators 446-448. The comparator 446 compares a boosted output from the error amplifier 422 (such as with a 0.9V boost) to the output of the combiner 436. The comparator 448 compares the output of the combiner 436 to a threshold (such as 1.2V). The outputs of the comparators 446-448 are provided to an OR gate 450, which provides its output to a DFC control unit 452 and a set-reset latch 454. Outputs from the DFC control unit 452 and the set-reset latch 454 are provided to an AND gate 456, which has an output coupled to a level shift unit 458. The level shift unit 458 provides output signals for driving the transistor 304 to the driver 438.

The comparator 448 supports cycle-by-cycle current limiting. Since the emulated current produced by the combiner 436 is proportional to the current through the output transistor 304, the emulated current can be compared to a threshold to provide over-current detection. Here, the comparator 448 compares the emulated signal to a threshold (such as 1.2V). If the threshold is exceeded, the current PWM cycle can be terminated. Although not shown, an additional comparator can be used to monitor the drain-to-source voltage of the output transistor 304 and, if a threshold such as 1.5V is exceeded, immediately turn off the output transistor 304. This could help to protect the output transistor 304 in catastrophic conditions like sudden saturation of the inductor 306.

In this example embodiment, the DFC control unit 452 can implement a control approach that is the same as or similar to that shown in FIG. 1. More specifically, the DFC control unit 452 can ensure at least a minimum amount of off time $T_{OFF}$ for the output transistor 304. The DFC control unit 452 can also decrease a frequency of the clock signal CLK so that the on time $T_{ON}$ for the output transistor 304 can be increased when a dropout condition is detected. As a particular example, the minimum off time $T_{OFF\_MIN}$ could be between 280 ns and 365 ns. Also, the point at which DFC can no longer be used to reduce the dropout voltage (where the controller 302 enters "Region 3") could be approximately one-third of the desired oscillator frequency ($f_{SW}$).

Figure 5:
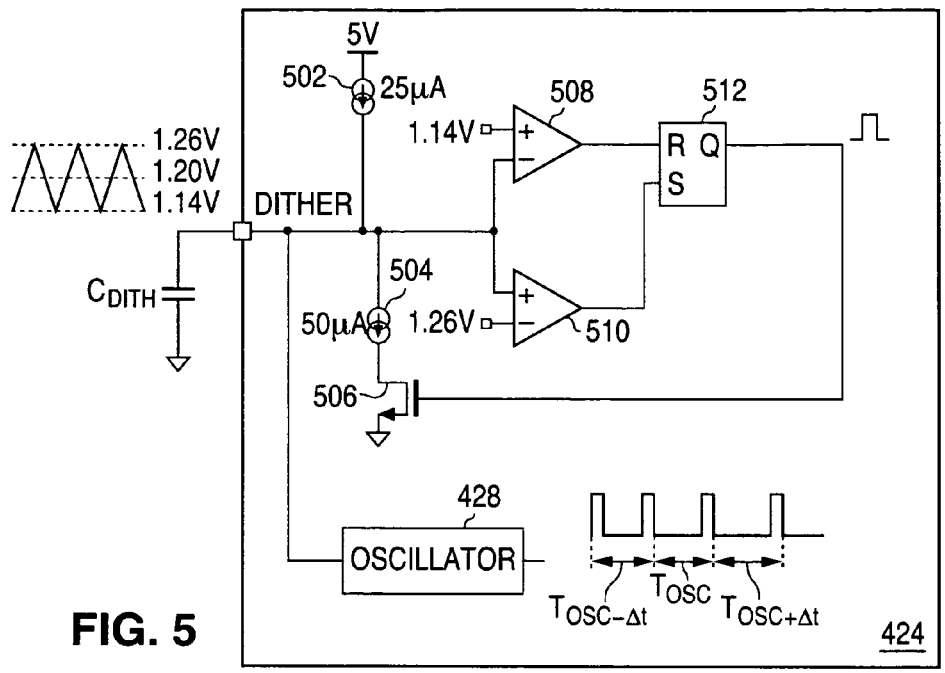

FIG. 5 illustrates an example embodiment of the frequency dithering circuit 424 that could, for example, implement a ±5% dithering function. This can help to spread electromagnetic interference (EMI) of the controller 302 over a range of frequencies. This can also help to reduce the size and quantity of EMI filtering components needed. In this example, the frequency dithering circuit 424 includes two current sources 502-504, an NMOS transistor 506, two comparators 508-510, and a set-reset latch 512. A dithering capacitor $C_{DITHER}$ is charged and discharged by the current sources 502-504 and the transistor 506. The comparators 508-510 compare the voltage on the capacitor $C_{DITHER}$ to two thresholds (such as 1.26V and 1.14V), and the latch 512 toggles back and forth based on the outputs of the comparators 508-510 to charge and discharge the capacitor $C_{DITHER}$. The voltage on the capacitor $C_{DITHER}$ is therefore a triangular wave that moves back and forth between the two thresholds used by the comparators 508-510. The voltage on the capacitor $C_{DITHER}$ is provided to the oscillator 428 to modulate the oscillator frequency by ±5% from the nominal frequency defined by the resistor $R_{RT}$. The capacitance of the capacitor $C_{DITHER}$ controls the rate of the frequency modulation.

Figure 6:
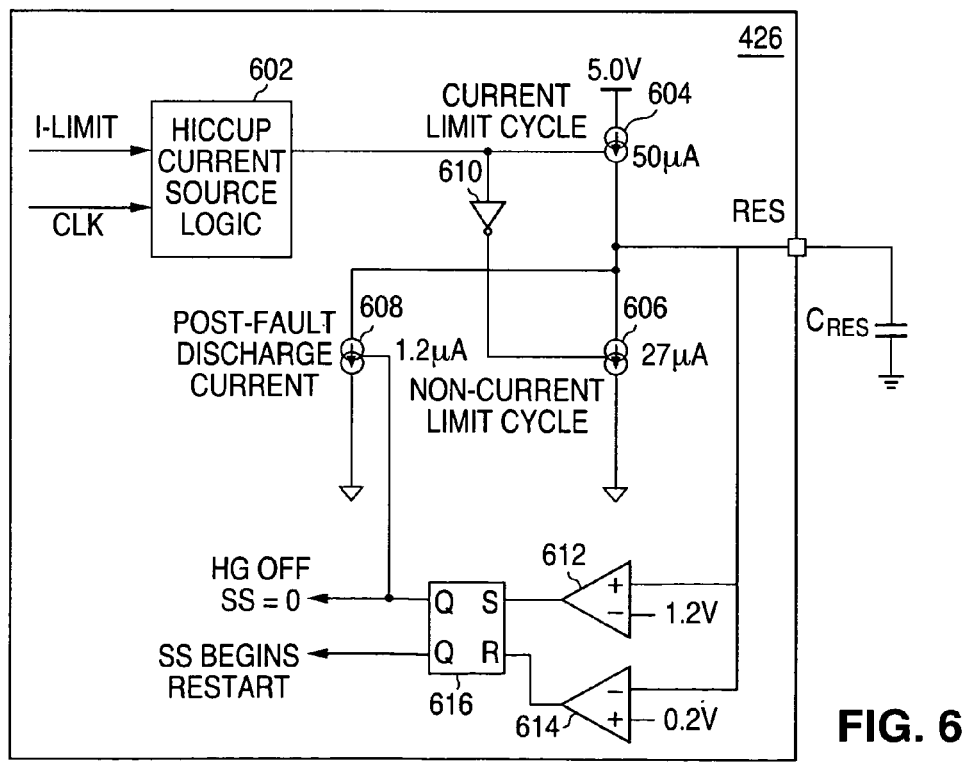

FIG. 6 illustrates an example embodiment of the hiccup restart logic 426, which can provide overload protection during over-current conditions. The hiccup restart logic 426 operates to provide a current limit timer that disables the controller 302 and provides a delay before restarting. The number of current limit events (the number of times the output of the combiner 436 exceeds the threshold used by the comparator 448) needed to trigger a restart can be set using a reset capacitor $C_{RES}$. In this example, the hiccup restart logic 426 includes source logic 602, three current sources 604-608, an inverter 610, two comparators 612-614, and a set-reset latch 616. The current sources 604-608 source current to and sink current from the capacitor $C_{RES}$. The source logic 602 uses the output of the combiner 436 (denoted I-Limit) and the clock signal CLK to control the current sources 604-606.

If the emulated signal from the combiner 436 exceeds a threshold such as 1.2V, the current PWM cycle can be terminated, and the current source 604 injects current (such as 50 μA) into the capacitor $C_{RES}$ during the next cycle. If a current limit event is not detected, the current source 606 sinks current (such as 27 μA) from the capacitor $C_{RES}$ during the next cycle. During overload, the controller 302 is protected with cycle-by-cycle current limiting until the voltage at the RES pin exceeds an upper threshold (such as 1.2V). When that upper threshold is met, a hiccup mode sequence can be initiated. This sequence can include:
- discharging the capacitor $C_{SS}$;
- discharging the capacitor $C_{RES}$ using current (such as 1.2 μA) from the current source 608;
- performing a soft-start once the voltage on the capacitor $C_{RES}$ reaches a lower threshold (such as 0.2V);
- if the overload persists after restart, repeating the discharging and soft-start steps; and
- if the overload is no longer present, holding the RES pin at ground using the current source 606 and resuming normal operation. Here, the comparators 612-614 determine when the upper and lower thresholds are met, and the latch 616 uses outputs of the comparators 612-614 to disable the HG pin and trigger soft-start.

The timer provided by the hiccup restart logic 426 can be used in several modes. For example, in cycle-by-cycle mode, the hiccup logic can be completely disabled by connecting the RES pin to ground. In this configuration, cycle-by-cycle protection limits the output current indefinitely, and no hiccup sequence occurs. In delayed hiccup mode, connecting the capacitor $C_{RES}$ to the RES pin provides a programmed number of cycle-by-cycle current limit events before initiating a hiccup mode restart. In this mode, a short-term overload may not cause a hiccup mode restart. In an externally-controlled hiccup mode, the RES pin can be used as an input. Driving the RES pin to a level greater than an upper threshold (such as 1.2V) can force the controller 302 into a delayed restart sequence. A trigger for the restart sequence could come from an over-temperature protection circuit, an output over-voltage sensor, or any other suitable signal source.

Figure 7A:
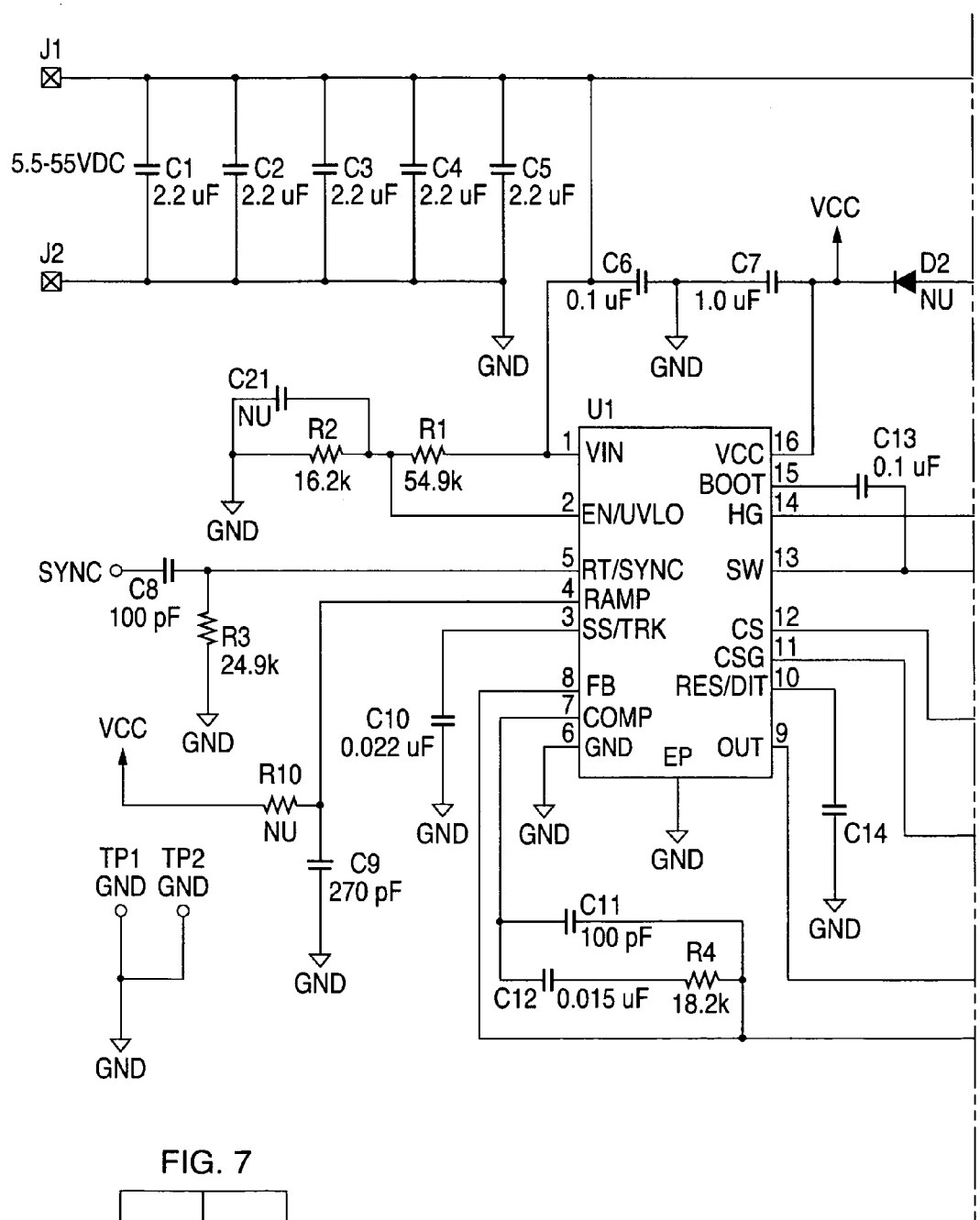
Figure 7B:
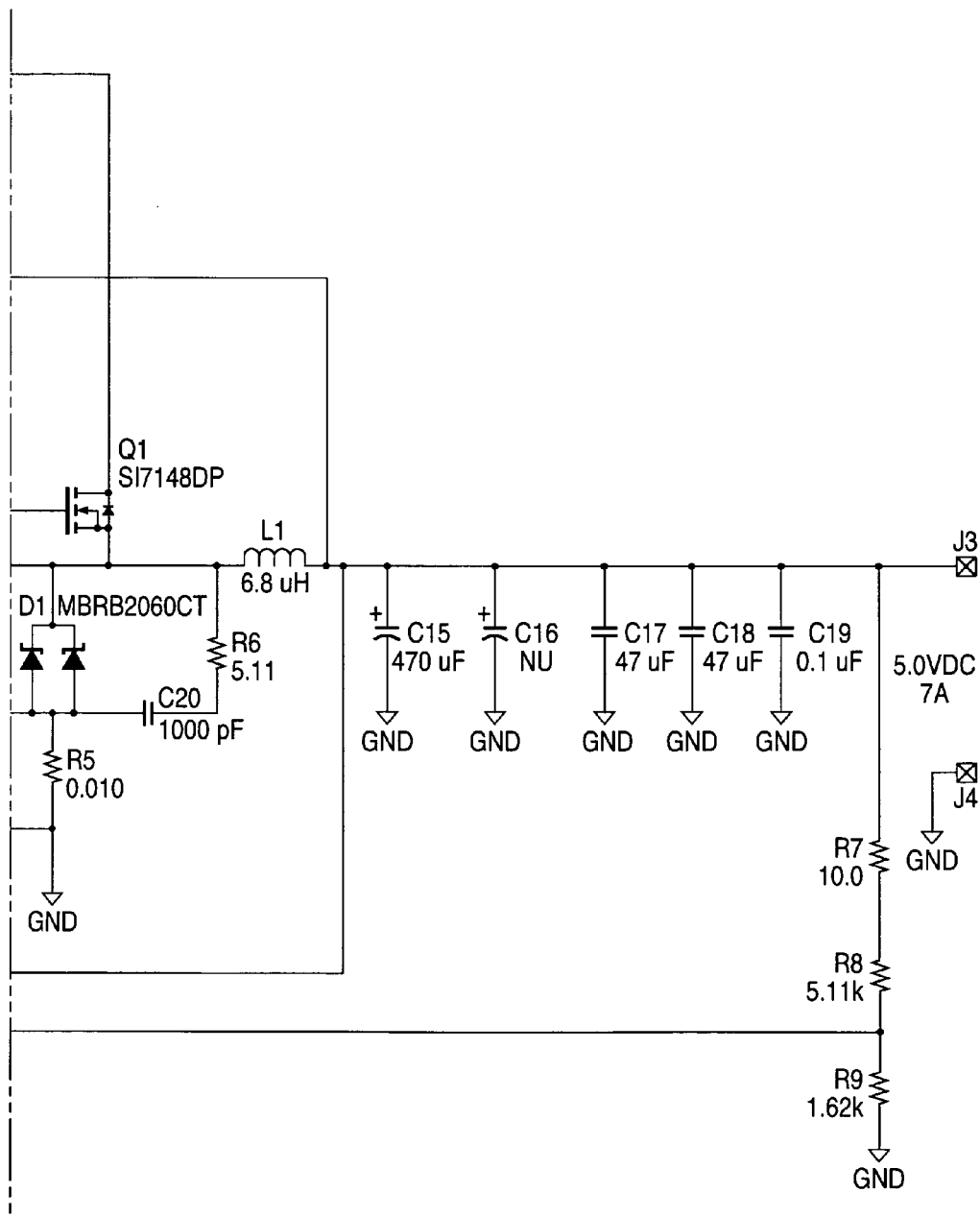

The buck controller 302 shown in FIGS. 3 through 6 is well suited for a wide range of applications, such as those where efficient step-down of a high, unregulated input voltage is required. Example applications can include telecommunications, industrial, and automotive applications. One specific use of the buck controller 302 is shown in FIG. 7. In this example, the capacitor C14 could be 0.1 μF when used with the frequency dithering circuit 424 or 0.022 μF when used with the hiccup restart logic 426.

Although FIGS. 3 through 7 illustrate one specific implementation of a switching regulator 300 having dynamic dropout voltage reduction and related details, various changes may be made to FIGS. 3 through 7. For example, while these figures illustrate specific values (such as specific voltages, currents, capacitances, inductances, and resistances), these values are for illustration only. Also, the functional division shown in FIGS. 3 through 7 is for illustration only. Various components in FIGS. 3 through 7 could be omitted, combined, or further subdivided and additional components could be added according to particular needs. In addition, each component in FIGS. 3 through 7 could be implemented using any suitable structure(s).

Figure 8:
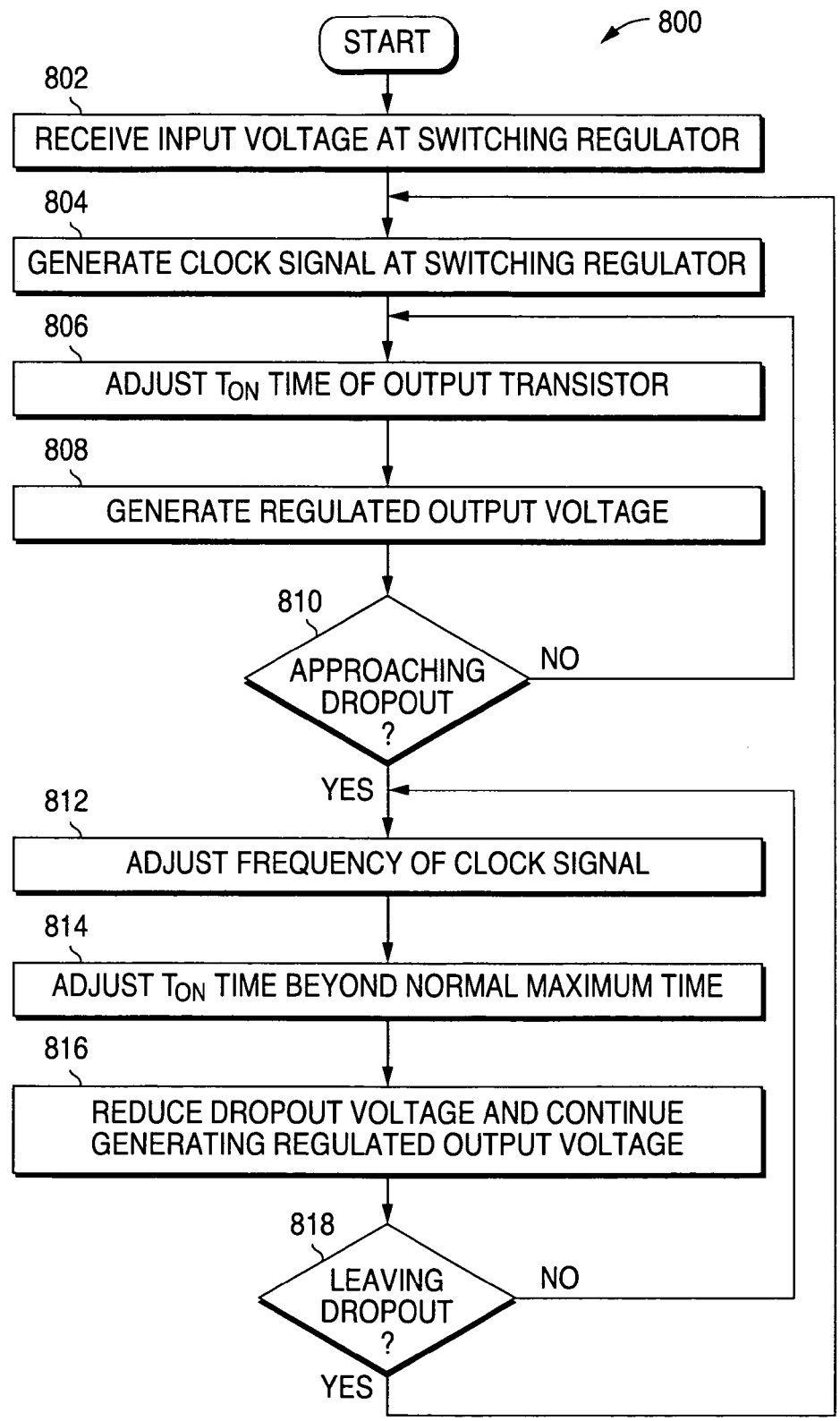
FIG. 8 illustrates an example method for switching voltage regulation with dynamic dropout voltage reduction according to this disclosure.

FIG. 8 illustrates an example method 800 for switching voltage regulation with dynamic dropout voltage reduction according to this disclosure. As shown in FIG. 8, an input voltage $V_{IN}$ is received at a switching regulator at step 802. This could include, for example, the controller 102 receiving an input voltage $V_{IN}$ between 4.5V-75V, where the input voltage $V_{IN}$ could vary over time.

A clock signal is generated at the switching regulator at step 804. This could include, for example, the oscillator 129 generating a clock signal CLK. An on time $T_{ON}$ of an output transistor is adjusted at step 806, and a regulated output voltage $V_{OUT}$ is generated at step 808. This could include, for example, the controller 102 adjusting the $T_{ON}$ time of the output transistor 114 during each switching period of the clock signal CLK so that the on time does not exceed a maximum on time $T_{ON\_MAX}$. The $T_{ON}$ time of the output transistor 114 is controlled so that the output voltage $V_{OUT}$ remains relatively constant and therefore in regulation. If the switching regulator is not approaching dropout at step 810, the method 800 returns to step 806 to continue adjusting the on time $T_{ON}$ of the output transistor to maintain the output voltage $V_{OUT}$ in regulation.

If the switching regulator is approaching dropout at step 810, the switching regulator adjusts the frequency of the clock signal at step 812. This could include, for example, the dynamic frequency timer 130 of the oscillator 129 decreasing the frequency $F_{OSC}$ of the clock signal CLK. The on time $T_{ON}$ of the output transistor is adjusted beyond its normal maximum on time at step 814. This could include, for example, the dynamic frequency timer 130 allowing the $T_{ON}$ time to exceed the normal $T_{ON\_MAX}$ time up to the $T_{ON\_MAX\_DFC}$ time. This reduces the dropout voltage and allows the regulated output voltage $V_{OUT}$ to continue to be generated at step 816. In this way, a regulated output voltage $V_{OUT}$ can continue to be generated even as the input voltage $V_{IN}$ decreases beyond the point that would normally cause dropout. If the switching regulator leaves dropout operation at step 818, the method 800 returns to step 804 to generate a normal clock signal and resume normal operation. Otherwise, the method 800 returns to step 812 or 814 to continue adjusting the frequency of the clock signal or the on time to try and keep the switching regulator in regulation.

Although FIG. 8 illustrates one example of a method 800 for switching voltage regulation with dynamic dropout voltage reduction, various changes may be made to FIG. 8. For example, while shown as a series of steps, various steps in FIG. 8 could overlap, occur in parallel, occur multiple times, or occur in a different order.

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   generating a clock signal;
   generating a drive signal for a transistor in a switching regulator, the drive signal turning the transistor on and off to generate a regulated output voltage, the drive signal generated based on the clock signal; and
   dynamically decreasing a frequency of the clock signal to decrease a dropout voltage of the switching regulator;
   wherein generating the clock signal and dynamically decreasing the frequency of the clock signal comprise:
      comparing a voltage on a capacitor to a first threshold voltage, the first threshold voltage defining a maximum amount of on-time for the transistor during shorter switching periods defined by the clock signal; and
      comparing the voltage on the capacitor to a second threshold voltage, the second threshold voltage defining a maximum amount of on-time for the transistor during longer switching periods defined by the clock signal.

2. The method of claim 1, wherein dynamically decreasing the frequency of the clock signal increases a duration of the switching periods defined by the clock signal.

3. The method of claim 1, further comprising:
   dynamically increasing the frequency of the clock signal when the switching regulator comes out of a dropout mode of operation.

4. The method of claim 1, wherein:
   the clock signal has a first frequency when an input voltage to the switching regulator is at a specified level;
   dynamically decreasing the frequency of the clock signal comprises decreasing the frequency of the clock signal from the first frequency towards a second frequency when the input voltage to the switching regulator falls below the specified level and is within a first range; and
   the frequency of the clock signal has the second frequency when the input voltage to the switching regulator is within a second range below the first range.

5. A method comprising:
   generating a drive signal for a transistor in a switching regulator, the drive signal turning the transistor on and off to generate a regulated output voltage, the drive signal generated based on a clock signal; and
   dynamically decreasing a frequency of the clock signal to decrease a dropout voltage of the switching regulator;
   wherein dynamically decreasing the frequency of the clock signal increases a duration of switching periods defined by the clock signal;
   wherein the dropout voltage has a first value proportional to $T_{OFF\_MIN}/T_{ON\_MAX}$ during shorter switching periods and a second value proportional to $T_{OFF\_MIN}/T_{ON\_MAX\_DFC}$ during longer switching periods;
   wherein $T_{OFF\_MIN}$ represents a minimum amount of off-time for the transistor during each switching period;
   wherein $T_{ON\_MAX}$ represents a maximum amount of on-time for the transistor during the shorter switching periods; and
   wherein $T_{ON\_MAX\_DFC}$ represent a maximum amount of on-time for the transistor during the longer switching periods.

6. The method of claim 5, further comprising:
   generating the clock signal using a first timer defining the maximum amount of on-time during the shorter switching periods and a second timer defining the maximum amount of on-time during the longer switching periods.

7. The method of claim 5, wherein the switching regulator moves out of regulation and the output voltage follows an input voltage if a difference between the input voltage and the output voltage exceeds the second value of the dropout voltage.

8. A switching regulator comprising:
   first circuitry configured to generate a drive signal for turning a transistor on and off to generate a regulated output voltage, the first circuitry configured to generate the drive signal based on a clock signal; and
   second circuitry configured to generate the clock signal and to dynamically decrease a frequency of the clock signal to decrease a dropout voltage of the switching regulator, wherein the second circuitry comprises:
      a first comparator configured to compare a voltage on a capacitor to a first threshold voltage, the first threshold voltage defining a maximum amount of on-time for the transistor during shorter switching periods defined by the clock signal; and
      a second comparator configured to compare the voltage on the capacitor to a second threshold voltage, the second threshold voltage defining a maximum amount of on-time for the transistor during longer switching periods defined by the clock signal.

9. The switching regulator of claim 8, wherein the second circuitry is configured to generate the clock signal such that:
   the clock signal has a first frequency when an input voltage to the switching regulator is at a specified level;

the frequency of the clock signal decreases from the first frequency towards a second frequency when the input voltage to the switching regulator falls below the specified level and is within a first range; and the frequency of the clock signal has the second frequency when the input voltage to the switching regulator is within a second range below the first range.

10. The switching regulator of claim 8, wherein the second circuitry further comprises:

an AND gate having a first input coupled to an output of the first comparator and a second input coupled to the first circuitry;

an OR gate having a first input coupled to an output of the AND gate and a second input coupled to an output of the second comparator;

a set-reset latch having an input coupled to an output of the OR gate;

an inverter coupled to an output of the set-reset latch; and a second transistor coupled across the capacitor and having a gate coupled to an output of the inverter.

11. The switching regulator of claim 10, wherein the second circuitry further comprises:

a third comparator configured to compare a voltage on a second capacitor to a third threshold voltage, the third threshold voltage associated with a duration of a minimum amount of off-time for the transistor during each switching period, the third comparator having an output coupled to the set-reset latch; and a third transistor coupled across the second capacitor and having a gate coupled to the output of the set-reset latch.

12. The switching regulator of claim 8, wherein the first circuitry comprises:

an error amplifier configured to amplify a difference between a reference voltage and a feedback voltage, the feedback voltage based on the output voltage;

a comparator configured to compare an output signal from the error amplifier to a ramp voltage;

a set-reset latch having a first input coupled to an output of the comparator and a second input configured to receive the clock signal;

an AND gate having a first input coupled to an output of the set-reset latch and a second input configured to receive an inverted clock signal;

a level shifter coupled to an output of the AND gate; and a gate driver coupled to an output of the level shifter, the gate driver configured to generate the drive signal.

13. The switching regulator of claim 8, wherein the second circuitry is configured to dynamically decrease the frequency of the clock signal to increase a duration of the switching periods defined by the clock signal.

14. A system comprising:

a transistor configured to receive an input voltage;

an inductor coupled to the transistor and configured to generate an output voltage; and a switching regulator controller comprising:

first circuitry configured to generate a drive signal for turning the transistor on and off, the first circuitry configured to generate the drive signal based on a clock signal; and second circuitry configured to generate the clock signal and to dynamically decrease a frequency of the clock signal to decrease a dropout voltage of the system;

wherein the second circuitry comprises:

a first comparator configured to compare a voltage on a capacitor to a first threshold voltage, the first threshold voltage defining a maximum amount of on-time for the transistor during shorter switching periods defined by the clock signal; and a second comparator configured to compare the voltage on the capacitor to a second threshold voltage, the second threshold voltage defining a maximum amount of on-time for the transistor during longer switching periods defined by the clock signal.

15. The system of claim 14, wherein the second circuitry is configured to generate the clock signal such that:

the clock signal has a first frequency when an input voltage to the switching regulator is at a specified level;

the frequency of the clock signal decreases from the first frequency towards a second frequency when the input voltage to the switching regulator falls below the specified level and is within a first range; and the frequency of the clock signal has the second frequency when the input voltage to the switching regulator is within a second range below the first range.

16. The system of claim 14, wherein the second circuitry further comprises:

an AND gate having a first input coupled to an output of the first comparator and a second input coupled to the first circuitry;

an OR gate having a first input coupled to an output of the AND gate and a second input coupled to an output of the second comparator;

a set-reset latch having an input coupled to an output of the OR gate;

an inverter coupled to an output of the set-reset latch; and a second transistor coupled across the capacitor and having a gate coupled to an output of the inverter.

17. The system of claim 16, wherein the second circuitry further comprises:

a third comparator configured to compare a voltage on a second capacitor to a third threshold voltage, the third threshold voltage associated with a duration of a minimum amount of off-time for the transistor during each switching period, the third comparator having an output coupled to the set-reset latch; and a third transistor coupled across the second capacitor and having a gate coupled to the output of the set-reset latch.

18. The system of claim 14, wherein the first circuitry comprises:

an error amplifier configured to amplify a difference between a reference voltage and a feedback voltage, the feedback voltage based on the output voltage;

a comparator configured to compare an output signal from the error amplifier to a ramp voltage;

a set-reset latch having a first input coupled to an output of the comparator and a second input configured to receive the clock signal;

an AND gate having a first input coupled to an output of the set-reset latch and a second input configured to receive an inverted clock signal;

a level shifter coupled to an output of the AND gate; and a gate driver coupled to an output of the level shifter, the gate driver configured to generate the drive signal.

19. The system of claim 14, wherein the second circuitry is configured to dynamically decrease the frequency of the clock signal to increase a duration of the switching periods defined by the clock signal.

20. A system comprising:

a transistor configured to receive an input voltage;

an inductor coupled to the transistor and configured to generate an output voltage; and a switching regulator controller comprising:
  first circuitry configured to generate a drive signal for turning the transistor on and off, the first circuitry configured to generate the drive signal based on a clock signal; and
  second circuitry configured to generate the clock signal and to dynamically decrease a frequency of the clock signal to decrease a dropout voltage of the system;
wherein the second circuitry is configured to dynamically decrease the frequency of the clock signal to increase a duration of switching periods defined by the clock signal;
wherein the dropout voltage has a first value proportional to $T_{OFF\_MIN}/T_{ON\_MAX}$ during shorter switching periods and a second value proportional to $T_{OFF\_MIN}/T_{ON\_MAX\_DFC}$ during longer switching periods;
wherein $T_{OFF\_MIN}$ represents a minimum amount of off-time for the transistor during each switching period;
wherein $T_{ON\_MAX}$ represents a maximum amount of on-time for the transistor during the shorter switching periods; and
wherein $T_{ON\_MAX\_DFC}$ represent a maximum amount of on-time for the transistor during the longer switching periods.

21. A switching regulator comprising:
first circuitry configured to generate a drive signal for turning a transistor on and off to generate a regulated output voltage, the first circuitry configured to generate the drive signal based on a clock signal; and
second circuitry configured to generate the clock signal and to dynamically decrease a frequency of the clock signal to decrease a dropout voltage of the switching regulator;
wherein the second circuitry is configured to dynamically decrease the frequency of the clock signal to increase a duration of switching periods defined by the clock signal;
wherein the dropout voltage has a first value proportional to $T_{OFF\_MIN}/T_{ON\_MAX}$ during shorter switching periods and a second value proportional to $T_{OFF\_MIN}/T_{ON\_MAX\_DFC}$ during longer switching periods;
wherein $T_{OFF\_MIN}$ represents a minimum amount of off-time for the transistor during each switching period;
wherein $T_{ON\_MAX}$ represents a maximum amount of on-time for the transistor during the shorter switching periods; and
wherein $T_{ON\_MAX\_DFC}$ represent a maximum amount of on-time for the transistor during the longer switching periods.

* * * * *